A. COLTON.
Bee Hive.
No. 4,343.
Patented Dec. 31, 1845.
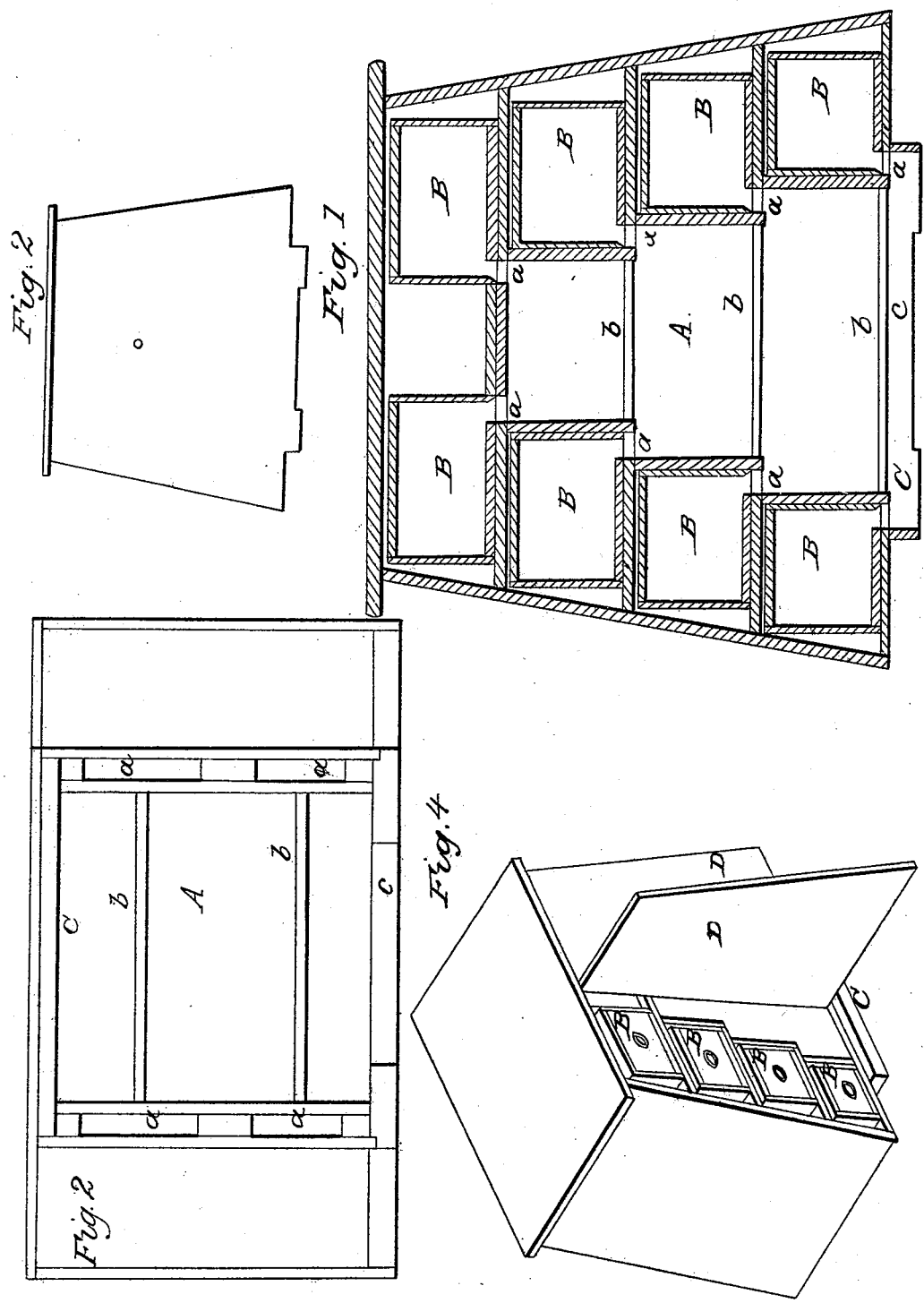

UNITED STATES PATENT OFFICE.

AARON COLTON, OF PITTSFIELD, VERMONT.

BEEHIVE.

Specification of Letters Patent No. 4,343, dated December 31, 1845.

*To all whom it may concern:*

Be it known that I, AARON COLTON, of Pittsfield, in the county of Rutland and State of Vermont, have invented a new and Improved Beehive, which I denominate "Colton's Improved Beehive;" and I do hereby declare the following to be a full and exact description thereof, reference being had to the accompanying drawings, making a part of this specification.

Figure 1, is a vertical section; Fig. 2, is a view of the bottom of the hive in a reversed position; Fig. 3, is an elevation of the rear side of the hive; and Fig. 4 is a perspective elevation of the hive with one of its doors open.

The nature of my invention consists in arranging movable drawers, in chambers on each side of the main interior portion of the hive, and connecting them with the same in such a manner that from the nature and habits of the bees, they are certain to go into and fill them with honey; when they can be removed and empty drawers take their places to be again filled by the bees. The following is the form of my hive—the front and rear sides are vertical; the right and left sides of the exterior portion of the same slant inward considerably from the bottom to the top of the hive; the chambers for the reception of the drawers are arranged on the right and left sides of the hive, inside of these is the main interior portion of the hive where the bees commence their labor and where they lay up their stores of honey.

In the accompanying drawings, A, is the main interior portion of the hive.

B, B, &c., are the drawers arranged in their respective chambers. Each chamber projects inward beyond the one next below it about two inches, and the sides of the interior of the hive are carried up vertically until they reach the next projecting chamber, and so on to the top of the hive.

$a$, $a$, are the openings from the interior of the hive into the drawers, these in all cases should be just an inch and a half broad.

$b$, $b$, are rods extending across the hive to support the honey, these rods are secured to the sides of the hive just above the center of each opening into the drawers. There are two openings from the interior of the hive into the chambers and drawers. I sometimes have one drawer extend the whole depth of the chamber, and sometimes two, one in the rear of the other, one over each opening.

C, is the base upon which the hive stands.

$c$, is the aperture in the base for the bees to enter into the interior of the hive.

$d$, $d$, are small glass windows, placed in the front ends of the drawers.

D, D, are the doors which close up the chambers in which the drawers B, B, are placed.

It is well known to those familiar with the habits of bees, that they commence immediately after they are placed in a hive, at the top of the hive first, and always lay their comb in the direction of the greatest length of the same, provided the supporting rods or sticks cross the hive in an opposite direction. Honey comb is always composed of sheets or layers one and half inches in width.

In my improved hive the bees commence their comb at the top of the hive laying it in the direction of the length of the drawers, and bring it down to the offset at the first set of drawers, here they find an enlargement of the hive, sufficient to extend their comb another sheet in width, and as they never fail to fill every part of the hive as they work downward, they extend their comb into the recesses under the openings to each drawer, and finding a sufficient width in the openings into the drawers to admit of a layer of comb, they carry the same up into the drawers and continue working in the same until they are filled. The size of the openings into the drawers is so large that the bees have no difficulty in passing and repassing from the interior of the hive into the drawers, which prevents all difficulty in getting the bees to work, immediately after giving them new drawers. When the bees work through a round hole, from the main hive into the center of the drawers, they never will commence working in the drawers or boxes, connected with the interior of the hive, until the bees get too numerous to work in the main hive. The top set of drawers, in my improved bee hive, are not always filled with honey, but the remainder of the drawers are invariably filled. Whenever I wish to remove a drawer that has been filled with honey, to replace it by an empty one, I take a piece of tin and insert it under the drawers, which cuts through the comb; I then remove the drawer from the hive, and replace it by an empty drawer, and then remove the tin slide; the bees immediately perceive that their comb has been broken and commence repairing the same; in doing so they carry it up into the empty drawer, and fill it with honey.

Having thus fully described the construction and operation of my improved bee hive, what I claim as new therein and desire to secure by Letters Patent, is—

The manner in which the honey or lateral boxes are arranged, in combination with a pyramidal central hive, constructed and operating substantially in the manner and for the purpose herein set forth.

AARON COLTON.

Witnesses:
   Z. C. ROBBINS,
   O. H. THROOP.